US010314022B2

(12) United States Patent
Kim et al.

(10) Patent No.: US 10,314,022 B2
(45) Date of Patent: *Jun. 4, 2019

(54) METHOD AND APPARATUS FOR TRANSMITTING CONTROL INFORMATION IN WIRELESS COMMUNICATION SYSTEMS

(71) Applicant: Samsung Electronics Co., Ltd., Suwon-si, Gyeonggi-do (KR)

(72) Inventors: Younsun Kim, Seongnam-si (KR); Cheng Shan, Suwon-si (KR); Juho Lee, Suwon-si (KR); Hyojin Lee, Seoul (KR); Kiil Kim, Yongin-si (KR); Joonyoung Cho, Suwon-si (KR); Hyoungju Ji, Seoul (KR); Sangmin Ro, Seoul (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 712 days.

This patent is subject to a terminal disclaimer.

(21) Appl. No.: 14/625,150

(22) Filed: Feb. 18, 2015

(65) Prior Publication Data
US 2015/0163783 A1 Jun. 11, 2015

Related U.S. Application Data

(63) Continuation of application No. 13/679,086, filed on Nov. 16, 2012, now Pat. No. 9,247,537.
(Continued)

(51) Int. Cl.
H04W 4/00 (2018.01)
H04W 72/04 (2009.01)
(Continued)

(52) U.S. Cl.
CPC ........ H04W 72/042 (2013.01); H04B 7/0456 (2013.01); H04L 1/00 (2013.01);
(Continued)

(58) Field of Classification Search
CPC ... H04L 5/0007; H04L 5/0016; H04L 5/0051; H04L 5/0053; H04L 5/0094; H04L 1/02;
(Continued)

(56) References Cited

U.S. PATENT DOCUMENTS 8,611,449 B2 12/2013 Tang et al.
8,837,371 B2 9/2014 Su et al.
(Continued)

FOREIGN PATENT DOCUMENTS

CN 101631374 A 1/2010
CN 102170646 A 8/2011
(Continued)

OTHER PUBLICATIONS

Research in Motion, Design Consideration for E-PDCCH, R1-112373, 3GPP TSG RAN WG1 Meeting #66, Aug. 22-26, 2011.*
(Continued)

Primary Examiner — Harun Chowdhury
(74) Attorney, Agent, or Firm — Jefferson IP Law, LLP

(57) ABSTRACT

A method for transmitting control information by a base station in a wireless communication system is provided. The method includes determining a precoder to be applied to a resource and a Demodulation Reference Signal (DMRS) port, the resource being used to transmit the control information, and the DMRS port corresponding to the resource and being used to transmit a DMRS, precoding the resource and the DMRS port by using the determined precoder, and transmitting the control information and the DMRS to a user equipment.

18 Claims, 12 Drawing Sheets

Related U.S. Application Data

(60) Provisional application No. 61/587,351, filed on Jan. 17, 2012, provisional application No. 61/560,454, filed on Nov. 16, 2011.

(51) Int. Cl.
| | |
|---|---|
| *H04L 1/00* | (2006.01) |
| *H04B 7/0456* | (2017.01) |
| *H04L 5/00* | (2006.01) |
| *H04L 1/02* | (2006.01) |
| *H04L 27/00* | (2006.01) |

(52) U.S. Cl.
CPC .............. *H04L 1/02* (2013.01); *H04L 5/0007* (2013.01); *H04L 5/0053* (2013.01); *H04W 72/0406* (2013.01); *H04L 27/00* (2013.01)

(58) Field of Classification Search
CPC ........... H04W 72/042; H04W 72/0446; H04W 72/0406
USPC .................................. 370/329, 330, 335, 252
See application file for complete search history.

(56) References Cited

U.S. PATENT DOCUMENTS

| | | |
|---|---|---|
| 2009/0196366 A1 | 8/2009 | Shen et al. |
| 2009/0252125 A1 | 10/2009 | Vujcic |
| 2009/0285193 A1 | 11/2009 | Kim et al. |
| 2010/0067512 A1 | 3/2010 | Nam et al. |
| 2010/0080154 A1 | 4/2010 | Noh et al. |
| 2010/0172308 A1 | 7/2010 | Nam et al. |
| 2010/0195615 A1 | 8/2010 | Lee et al. |
| 2011/0044250 A1 | 2/2011 | Han et al. |
| 2011/0051749 A1 | 3/2011 | Cheng et al. |
| 2011/0085503 A1 | 4/2011 | Nam et al. |
| 2011/0170435 A1 | 7/2011 | Kim et al. |
| 2011/0170496 A1 | 7/2011 | Fong et al. |
| 2011/0194536 A1 | 8/2011 | Kim et al. |
| 2012/0121031 A1 | 5/2012 | Tang et al. |
| 2012/0176885 A1 | 7/2012 | Lee et al. |
| 2012/0300709 A1 | 11/2012 | Su et al. |
| 2013/0114522 A1* | 5/2013 | Frenne ................. H04L 5/0094 370/329 |
| 2013/0195034 A1 | 8/2013 | Noh et al. |

FOREIGN PATENT DOCUMENTS

| | | |
|---|---|---|
| RU | 2 421 911 C2 | 6/2011 |
| WO | 2007/073040 A1 | 6/2007 |
| WO | 2010/032953 A2 | 3/2010 |
| WO | 2011/028079 A2 | 3/2011 |
| WO | 2011/122829 A2 | 10/2011 |
| WO | 2011/122835 A2 | 10/2011 |
| WO | 2011/132942 A2 | 10/2011 |
| WO | 2011/132988 A2 | 10/2011 |

OTHER PUBLICATIONS

Research in Motion et al., Multiplexing of E-PDCCH for BF Transmission, 3GPP TSG RAN WG1 Meeting #67, San Francisco, USA, Nov. 14-18, 2011, R1-113959.
Research in Motion et al., E-PDCCH Transmission with DMRS as Demodulation RS, 3GPP TSG RAN WG1 Meeting #67, San Francisco, USA, Nov. 14-18, 2011, R1-113958.
Nokia et al., E-PDCCH Design Principles, 3GPP TSG RAN WG1 Meeting #67, San Francisco, USA, Nov. 14-18, 2011, R1-114329.
Samsung, DM-RS based Distributed and Localized E-PDCCH structure, 3GPP TSG RAN WG1 #67, R1-114239, Nov. 14-18, 2011, pp. 1-4, XP050562163, Sophia-Antipolis Cedex, France.
Samsung, Further Considerations of CDD Precoding, 3GPP TSG RAN WG1 Meeting #49bis, R1-073097, Jun. 25-29, 2007, pp. 1-5, XP050106749, Sophia-Antipolis Cedex, France.
Samsung et al., Further Considerations of CDD Precoding for High-speed UEs, 3GPP TSG RAN WG1 Meeting #50, R1-073566, pp. 1-6, XP050107171, Sophia-Antipolis Cedex, France.
NTT DOCOMO, DM-RS Design for E-PDCCH in Rel-11, 3GPP TSG-RAN WG1#67, R1-114302, Nov. 9, 2011, San Francisco, USA.
Panasonic, Discussion on Reference Signals for Enhanced PDCCH Transmission, 3GPP TSG-RAN WG1#67, R1-113814, San Francisco, USA.
Japanese Office Action dated Feb. 9, 2018, issued in Japanese Patent Application No. 2014-542252.

* cited by examiner

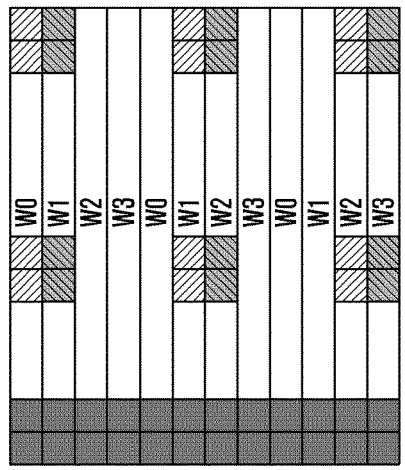
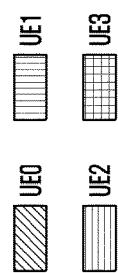
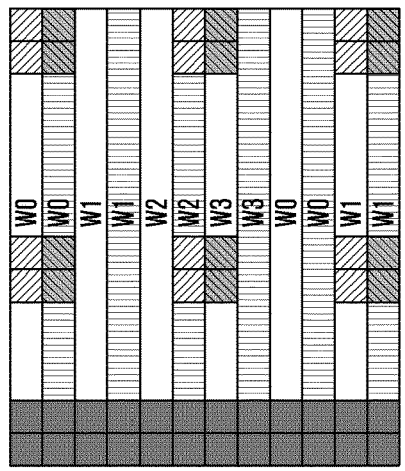
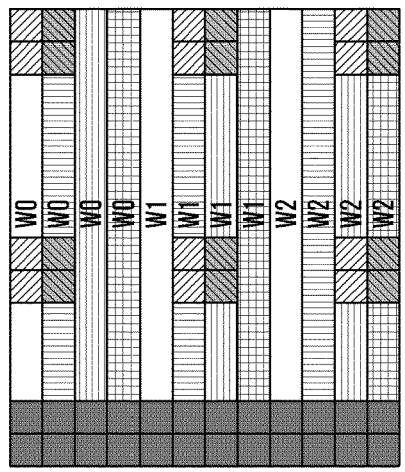
FIG. 5A    FIG. 5B    FIG. 5C

METHOD AND APPARATUS FOR TRANSMITTING CONTROL INFORMATION IN WIRELESS COMMUNICATION SYSTEMS

CROSS-REFERENCE TO RELATED APPLICATIONS

This application is a continuation application of a U.S. patent application Ser. No. 13/679,086, filed on Nov. 16, 2012, which claims the benefit under 35 U.S.C. § 119(e) of a U.S. provisional patent application filed on Nov. 16, 2011 in the U.S. Patent and Trademark Office and assigned Ser. No. 61/560,454 and a U.S. provisional patent application filed on Jan. 17, 2012 in the U.S. Patent and Trademark Office and assigned Ser. No. 61/587,351, the entire disclosure of each of which is hereby incorporated by reference.

BACKGROUND OF THE INVENTION

1. Field of the Invention

The present invention relates to a method and an apparatus for transmitting control information in wireless communication systems. More particularly, the present invention relates to a method for providing a transmission scheme that allows the transmitted signals to be received with a higher level of diversity order such that reliable transfer of information can be achieved even in mobile channels with dynamic variations in the time domain and the frequency domain.

2. Description of the Related Art

The present invention relates to a wireless cellular communication system with at least one base station (i.e., an evolved Node B (eNB)) and at least one User Equipment (UE). More particularly, the present invention relates to a wireless communication system where the eNB schedules both the downlink and uplink transmission to and from the UE. The scheduling is on a per-sub-frame basis and the scheduling indication is transmitted from the eNB to the UE via the control channel in each sub-frame of any downlink transmission.

Throughout the present invention, the 3rd Generation Partnership Project (3GPP) Long Term Evolution (LTE) Release 8~10 is regarded as the legacy system and the in-development Release 11 and beyond systems are taken as a system where the exemplary embodiments of the present invention can be implemented. The present invention can also be applied to other cellular systems where appropriate.

Downlink data information is conveyed through a Physical DL Shared CHannel (PDSCH). Downlink Control Information (DCI) includes DownLink Channel Status Information (DL CSI) feedback request to UEs, Scheduling Assignments (SAs) for uplink transmission from UEs (UL SAs) or for PDSCH receptions by UEs (DL SAs). The SAs are conveyed through DCI formats transmitted in respective Physical DL Control CHannels (PDCCHs). In addition to SAs, PDCCHs may convey DCI that is common to all UEs or to a group of UEs.

In the 3GPP LTE/LTE-Advanced (LTE-A) system, the downlink transmission employs Orthogonal Frequency Division Multiple Access (OFDMA) such that the entire system bandwidth is divided into multiple subcarriers. A group of 12 consecutive subcarriers are referred to as a Resource Block (RB). An RB is the basic unit of resource allocation in the LTE/LTE-A system.

FIG. 1 is a diagram illustrating a basic unit of resource allocation in an LTE/LTE-A system according to the related art.

Referring to FIG. 1, in the time domain, the basic unit of resource allocation in the LTE/LTE-A system is the sub-frame. Each subframe consists of 14 consecutive OFDM symbols as shown in FIG. 1. A Resource Element is the intersection of a subcarrier and an OFDM symbol represented by a square in FIG. 1 where a single modulation symbol can be transmitted.

As shown in FIG. 1, different time and frequency resources can be used to transmit different signal types. A Cell specific Reference Signal (CRS) is transmitted to support UE mobility, such as initial access, handover operations and to support legacy PDSCH transmission modes. A Demodulation Reference Signal (DMRS) is transmitted to support new PDSCH transmission modes. Control channels are transmitted to inform the UE of the size of the control region, downlink/uplink scheduling assignments, and ACKnowlegement/Non-ACKnowlegement (ACK/NACK) for uplink Hybrid Automatic Repeat reQuest (HARQ) operations. A Channel Status Information Reference Signal (CSI-RS) is transmitted to provide UEs with a reference signal for measuring the downlink channel for CSI feedback purposes. A CSI-RS can be transmitted on any of the group of REs marked with indices A, . . . , J. Additionally, zero power CSI-RS or muting can be configured in which case the RE positions marked by indices A, . . . , J are not used for the transmission of a reference signal, a data signal, or a control signal. Zero power CSI-RS or muting is used in an LTE-A system to enhance the measurement performance of UEs receiving CSI-RS from neighboring transmission points. The PDSCH is transmitted in the data region on REs which are not used for the transmission of CRS, DMRS, CSI-RS, zero power CSI-RS.

As mentioned above, the eNB transmits PDCCH in legacy LTE/LTE-A systems for various purposes, such as an uplink/downlink scheduling assignment or a CSI feedback request indication. Due to the nature of an OFDMA system which enhances performance using frequency selective scheduling and simultaneous transmissions to multiple UEs, optimized system performance necessitates multiple PDCCHs to be transmitted to multiple UEs. Additionally, supporting Multi-User Multiple Input Multiple Output (MIMO) (MU-MIMO) where PDSCH transmissions for different UEs are spatially separated using antenna technology also requires simultaneous PDCCH transmissions to multiple UEs.

In 3GPP release 8~10, the control channel is usually transmitted in the beginning of a sub-frame, so that the UE can efficiently acquire the scheduling information early enough for data decoding. The PDCCH is configured to be transmitted in the first one to three OFDM symbols in a sub-frame.

In order to provide the system with sufficient capacity for transmitting downlink/uplink scheduling assignments, a new Control Channel (CCH) named Enhanced Physical Data Control Channel (E-PDCCH or ePDCCH) was developed in LTE-A Release 11 to cope with the shortage of PDCCH capacity. A key factor that causes the shortage of PDCCH capacity is the fact that it is transmitted only in the first one to three OFDM symbols of a subframe. Furthermore, with frequent MU-MIMO transmissions where multiple UEs can be scheduled using the same frequency and time resources, the improvement on LTE/LTE-A systems is severely limited due to the shortage of PDCCH capacity. Unlike the PDCCH, the ePDCCH is transmitted on the data region of a subframe much like a PDSCH.

PDCCH Structure in LTE Rel8

In 3GPP LTE Release 8~10, a PDCCH is presented in the first several OFDM symbols. The number of OFDM symbols used for PDCCH is indicated in another Physical Control Format Indication Channel (PCFICH) in the first OFDM symbol. Each PDCCH consists of L Control Channel Elements (CCEs), where L=1, 2, 4, 8 representing different CCE aggregation levels, each CCE consists of 36 sub-carriers distributed throughout the system bandwidth.

PDCCH Transmission and Blind Decoding

Multiple PDCCHs are first attached with a user-specific Cyclic Redundancy Check (CRC), independently encoded and rate matched according to CCE aggregation level 1, 2, 4 or 8, depending on link qualities, and multiplexed and mapped to the PDCCH resources. At the UE side, the UE needs to search for its PDCCHs in a pre-determined search space by assuming a certain CCE aggregation level and using the user-specific CRC. This is called blind decoding as the user may need to try multiple decoding attempts before the PDCCH could be located and identified.

Diversity Achieving Transmission Schemes

In 3GPP LTE Release 8~10, a PDCCH is transmitted using Space Frequency Block Code (SFBC) on multiple eNB transmit antennas. SFBC is a form of transmission that allows a single modulation symbol from the UE to be received at the UE with a diversity order of two. In other words, assuming that the channel from antenna1 of the eNB to the UE is h1 and the channel from antenna2 of the eNB to the UE is h2, SFBC transmission allows the UE to recover the modulated signal which is scaled by $(|h_1|^2+|h_2|^2)$. The received modulated signal being scaled by $(|h_1|^2+|h_2|^2)$ means that the modulated signal has achieved a diversity order of 2. Without the use of a transmission scheme, such as SFBC, it would only be possible to achieve a diversity order of 1 in a flat fading channel. Typically, a higher diversity order would mean that the transmitted signal is more robust against wireless channel variations in the time or frequency domain. In other words, by achieving a higher diversity order, the received signal can be recovered with lower probability of error compared to the case of a lower diversity order.

SFBC in 3GPP is performed using CRS, which is a common reference signal that is used with multiple UEs connected to the same cell.

Another method of achieving diversity is by the use of delay Cyclic Delay Diversity (CDD). In 3GPP systems, large delay CDD scheme has been defined as:

$$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(v-1)}(i) \end{bmatrix}$$

where the precoding matrix W(i) is of size P×v, i=0, 1, ..., $M_{symb}^{ap}-1$ is the number of antenna ports, v is the number of transmission layer, and $M_{symb}^{ap}$ is the number of symbols to be precoded by the above equations. D(i) is a diagonal matrix, and U is a v×v matrix. The value of D(i) and U are predefined matrix dependent on the number of layers v.

The values of the precoding matrix W(i) are selected among the precoder elements in the codebook configured in the eNB and the UE. For 2 antenna ports, the precoder with index zero is selected. For 4 antenna ports, the UE may assume that the eNB cyclically assigns different precoders to different vectors $[x^{(0)}(i) \ldots x^{(v-1)}(i)]^T$ on the PDSCH. A different precoder is used for every V vector. More particularly, the precoder selected according to $W(i)=C_k$, where k is the precoder index given by $$k = \left(\left\lfloor \frac{i}{v} \right\rfloor \mod 4\right) + 1 \in \{1, 2, 3, 4\},$$

and $C_1$, $C_2$, $C_3$, $C_4$ denote precoder matrices corresponding to precoder indices 12, 13, 14, 15, respectively, in the four-antenna codebook. The use of large delay CDD creates an artificial delay effect on the received signal. In an OFDMA system, such delay corresponds to frequency selectivity and higher order of diversity.

DCI Transmission

A PDCCH transmission refers to a DCI transmission. There can be multiple DCIs targeting for one UE in a subframe, and a DCI could be targeting for one or multiple UEs. There are multiple types of DCI formats, among which downlink grant carries the resource allocation and transmission properties for PDSCH transmission in the present subframe, while uplink grant carries the resource allocation and transmission properties for PUSCH transmission in the uplink subframe.

PDSCH Transmission and UE-Specific Reference Signals

All those OFDM symbols after the PDCCH region can be assigned as PDSCH. The data symbols are mapped onto the sub-carriers of those OFDM symbols except the resource elements assigned for reference signals.

UE-specific reference signals, i.e., DMRS, are introduced into the system for simple implementation for beamforming transmission, where multiple antennas are precoded with different weights before transmission. In 3GPP LTE Release 8~10, the UE-specific reference signals are precoded with the same precoder as that of the data transmitted in the same resource block. Each resource block consists of 14 OFDM symbols in the time domain and 12 subcarriers in the frequency domain. By applying the same precoding as that applied for the data transmitted on the same resource block, the UE can estimate the effect of precoding from the UE-specific reference signal without having to receive some other information which indicates the applied precoding. The UE is thus able to decode the received signals assuming the signal is transmitted from those virtual antenna ports, without knowing the exact precoder information.

FIG. 2 is a diagram illustrating DMRS ports in a resource block according to the related art.

Referring to FIG. 2, the location and port definition of DMRS in 3GPP Release 10, which can support up to eight ports from #7~14 is illustrated. For the case where up to 4 DMRS ports are used, ports #7/8/9/10 are spread with a spreading factor of two in the time domain. For the case where more than 4 DMRS ports are used, all ports are spread with a spreading factor of four in the time domain.

There is another subframe structure in the preferred system referred to as a Multimedia Broadcast Single Frequency Network (MBSFN) subframe, where multiple eNBs will transmit identical signaling for broadcasting purposes. A UE can be configured to receive the MBSFN subframe since not every UE is the target for MBSFN broadcasting. The system can make use of such a feature to resolve the compatibility as well as high-overhead problems when new transmission modes are introduced into the system. For example in 3GPP, the release-8 UEs will not be able to recognize the DMRS on ports 7~14 as defined in release 10. The system can configure a subframe as a "MBSFN"

subframe to release 8 UEs, while a normal subframe with only DMRS in the PDSCH region is actually transmitted for release 10 UEs who can recognize DMRS ports 7~14 and decode data without CRS. Similar philosophy can also be applied to future evolving systems when new features are introduced.

However, in a MBSFN subframe where no CRS is defined, the legacy CDD transmission based on CRS transmission can no longer be configured. But such an open loop MIMO technique is still necessary in some scenarios when the feedback is not readily available or reliable, and/or the MIMO channel is rather selective in frequency and/or time domain.

Therefore, a need exists for a method and an apparatus for transmitting control information in wireless communication systems.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a transmission scheme that allows transmitted signals to be received with a higher level of diversity order such that reliable transfer of information can be achieved even in mobile channels with dynamic variations in the time domain and the frequency domain. To achieve the aforementioned objectives, the system divides the wireless resource used for the transmission of a control channel and maps different antenna ports for each of the divided wireless resource segments. A User Equipment (UE) derives the precoding and channel estimation for each wireless resource segment by using a mapping relationship between multiple wireless resource segments and multiple antenna ports.

In accordance with an aspect of the present invention, a method for transmitting control information by a base station in a wireless communication system is provided. The method includes determining a precoder to be applied to a resource and a Demodulation Reference Signal (DMRS) port, the resource being used to transmit the control information, and the DMRS port corresponding to the resource and being used to transmit a DMRS, precoding the resource and the DMRS port using the determined precoder, and transmitting the control information and the DMRS to a user equipment.

In accordance with another aspect of the present invention, a method for receiving control information by a user equipment in a wireless communication system is provided. The method includes receiving a subframe from a base station, determining a precoder to be applied to a resource being used to receive the control information by using a DMRS, and demodulating the resource by using the precoder.

In accordance with another aspect of the present invention, a base station for transmitting control information in a wireless communication system is provided. The base station includes a control unit configured to determine a precoder to be applied to a resource used to transmit the control information and a DMRS port corresponding to the resource and being used to transmit a DMRS, to precode the resource and the DMRS port by using the determined precoder, and to transmit the control information and the DMRS to user equipment.

In accordance with another aspect of the present invention, a user equipment for receiving control information in a wireless communication system is provided. The user equipment includes a control unit configured to receive a subframe from a base station, to determine a precoder to be applied to a resource being used to receive the control information by using a DMRS, and to demodulate the resource by using the precoder.

Exemplary embodiments of the present invention disclose methods of enhanced transmission with precoder cycling in the legacy Physical Downlink Shared CHannel (PDSCH) region. The proposed schemes can be applied to both data and enhanced control channel transmission in the legacy PDSCH region.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 5A through 5C are diagrams illustrating REG-based precoder cyclings according to exemplary embodiments of the present invention;

Throughout the drawings, it should be noted that like reference numbers are used to depict the same or similar elements, features, and structures.

DETAILED DESCRIPTION OF EXEMPLARY EMBODIMENTS

Figure 1:
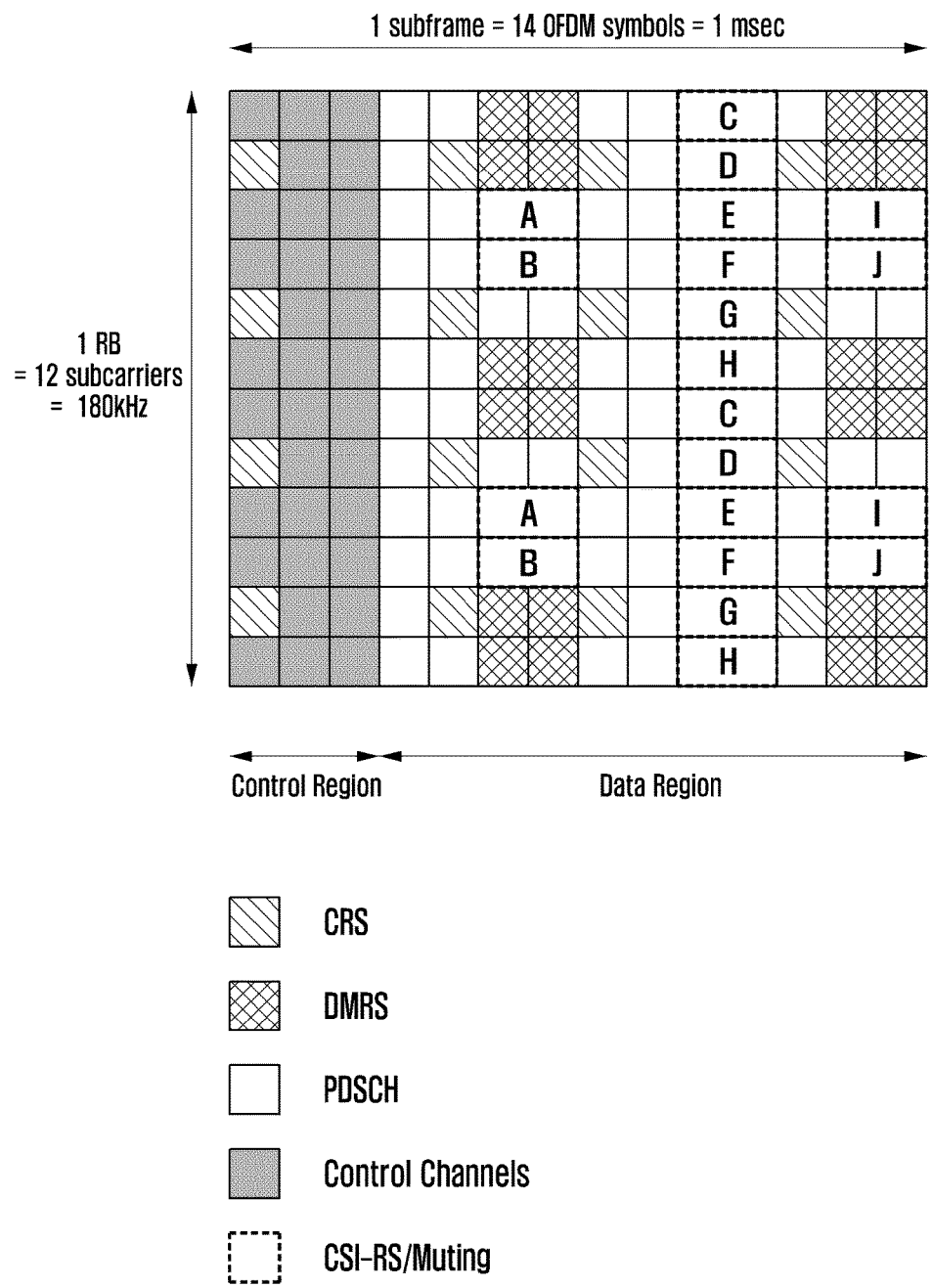
FIG. 1 is a diagram illustrating a basic unit of resource allocation in a Long Term Evolution (LTE)/LTE-Advanced (LTE-A) system according to the related art.
Figure 2:
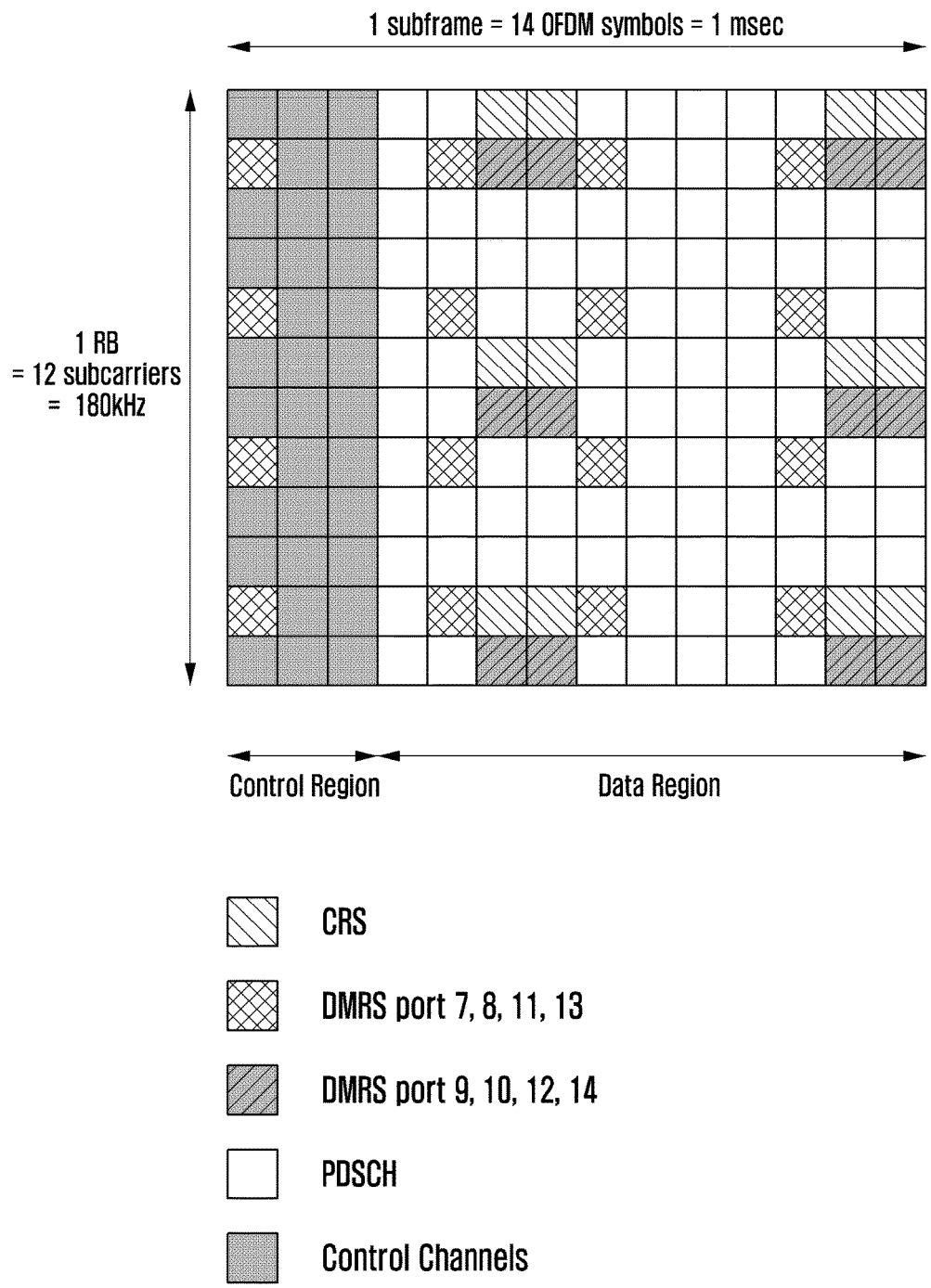
FIG. 2 is a diagram illustrating Demodulation Reference Signal (DMRS) ports in a resource block according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In an Orthogonal Frequency Division Multiple Access (OFDMA) based system, the system configures a set of resources for a particular User Equipment (UE) for either control or data transmission. The set of resources includes multiple Resource Elements (REs) which can be located within a Resource Block (RB) or distributed in multiple RBs. Demodulation Reference Signal (DMRS) ports are allocated in the at least one of multiple RBs for the UE to detect the transmission.

Exemplary embodiments of the present invention are applicable to, but not limited to, transfer of information on wireless communications systems, for example, for use in an Evolved Universal Mobile Telecommunications System Terrestrial Radio Access Network.

In exemplary embodiments of the present invention, the multiple REs are grouped into Resource Element Groups (REGs), where each REG contains at least one or multiple REs in the frequency and/or the time domain. The REs for an REG can be consecutive in the frequency and/or the time domain, or distributed/non-consecutive in the frequency and/or the time domain.

FIGS. 3A through 12, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIGS. 3A through 3F are diagrams illustrating REG partitioning for transmission of an Enhanced Control CHannel (ECCH) according to exemplary embodiments of the present invention.

Figure 3A:
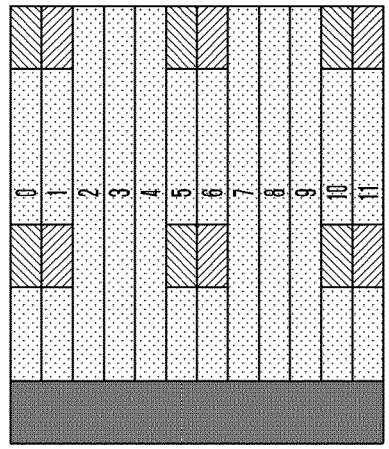
FIGS. 3A through 3F are diagrams illustrating Resource Element Group (REG) partitioning for transmission of an Enhanced Control CHannel (ECCH) according to exemplary embodiments of the present invention.
Figure 3B:
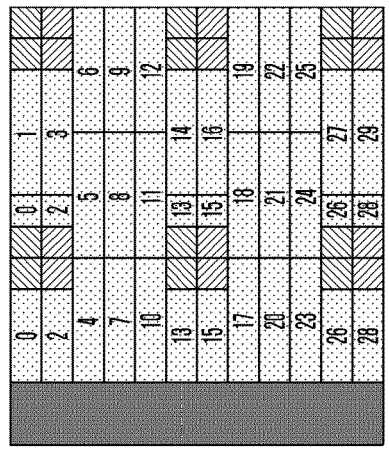
Figure 3C:
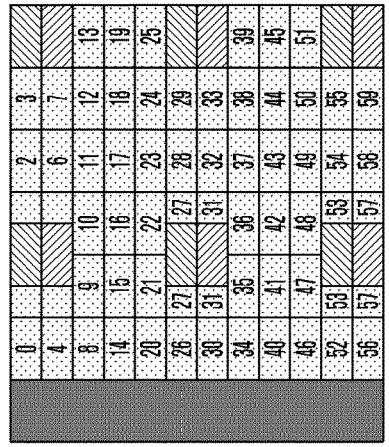
Figure 3D:
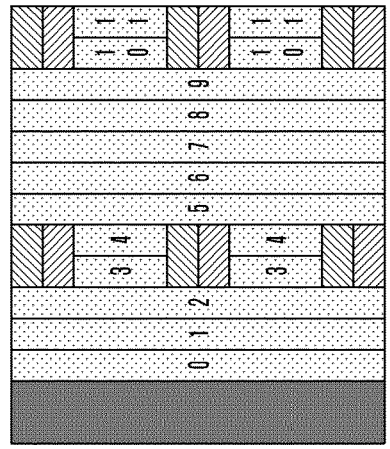
Figure 3E:
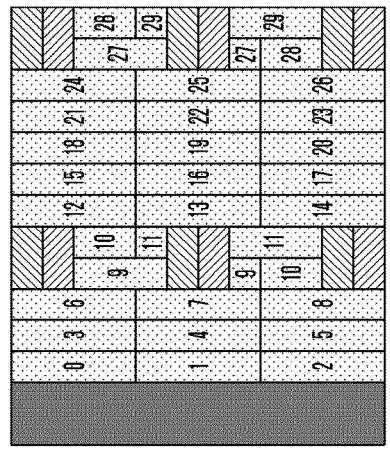
Figure 3F:
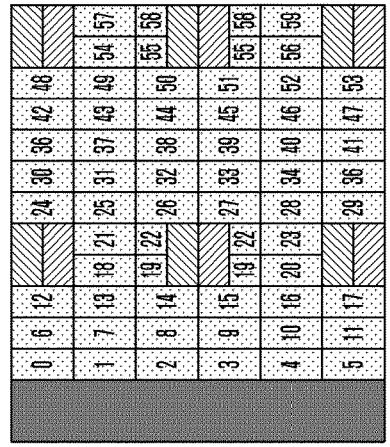

Referring to FIGS. 3A through 3F, exemplary consecutive REG portioning configurations are illustrated. In FIG. 3A, consecutive 2 REs except Reference Signal (RS) REs in the time domain are grouped as an REG. In FIG. 3B, consecutive 4 REs except RS REs in the time domain are grouped as an REG. In FIG. 3C, consecutive REs except RS REs for the same subcarrier in the same RB are grouped as an REG. The REG grouping can also be done in the frequency domain. In FIG. 3D, consecutive 2 REs except RS REs in the frequency domain are grouped as an REG. In FIG. 3E, consecutive 4 REs except RS REs in the frequency domain are grouped as an REG. In FIG. 3F, one Orthogonal Frequency Division Multiplexing (OFDM) symbol except RS REs are grouped as one REG. Note for the cases illustrated in FIGS. 3A, 3B, 3D, and 3E, the size of REG (number of REs in an REG) is fixed, while the REG size for the cases in FIGS. 3C and 3F may vary from one REG to another based on its actual location. If one constrains that an REG needs to be located in one subcarrier for FIGS. 3A and 3B, or in one OFDM symbol for FIGS. 3D and 3E, there could be orphan REs which cannot be utilized. Since precoding cycling is going to be applied RE by RE, it is now necessary for the channel within an REG to be coherent. Thus, an allocation of an REG across subcarriers or OFDM symbols will improve the efficiency by avoiding the orphan REs. For example, in FIG. 3A, REG #4 is allocated in two consecutive OFDM symbols, and in FIG. 3D, REG #4 is allocated in two consecutive subcarriers.

Figure 4:
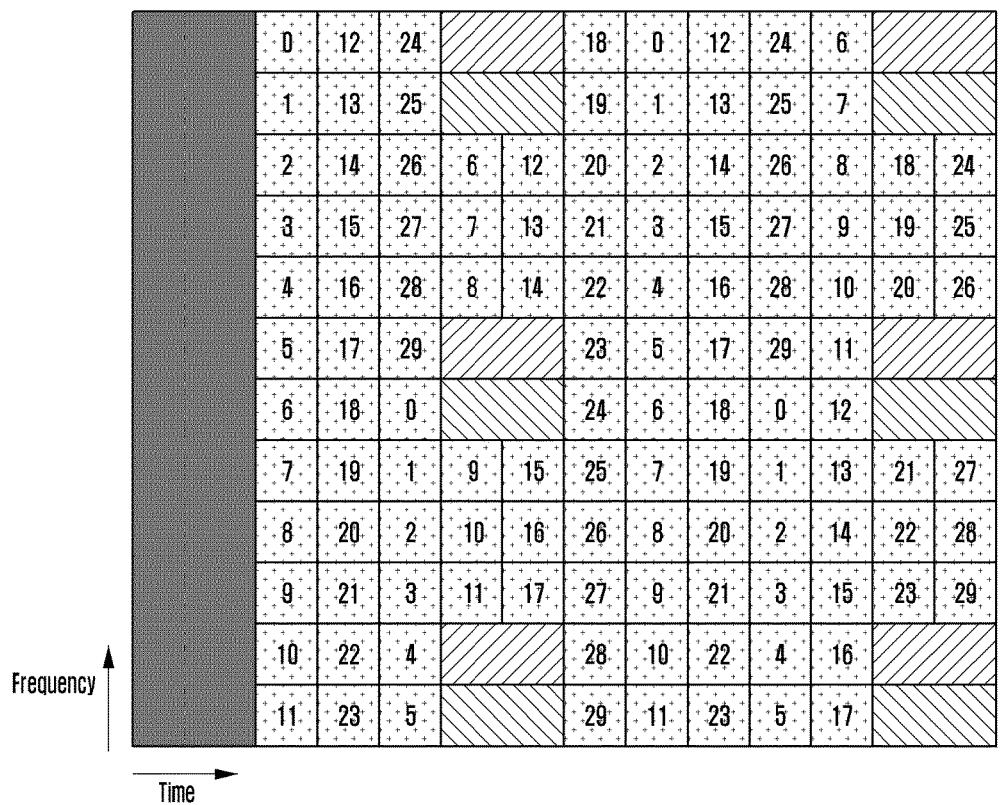
FIG. 4 is a diagram illustrating REG partitioning for transmission of an ECCH according to an exemplary embodiment of the present invention.

FIG. 4 is a diagram illustrating REG partitioning for transmission of an ECCH according to an exemplary embodiment of the present invention.

Referring to FIG. 4, 30 REGs are included in one RB. Each REG contains 4 REs distributed in the subframe. An REG can also contain multiple REs which are not consecutive in the frequency and/or the time domain.

The number of REs in an REG can be variable, it can also be one in some cases, i.e., a RE will represent one REG.

Note the indexing in FIGS. 3A through 3F and FIG. 4 is done within an RB either in frequency or time domain. When multiple RBs are allocated for the transmission with precoder cycling, the indexing can be also done through the multiple RBs either in frequency or time domain.

Multiple REGs maybe further be grouped into another resource set, namely, an Enhanced Control Channel Element (E-CCE), which will be the unit for enhanced control channel transmission. An E-CCE may contain multiple REGs across multiple RBs, or one or multiple REGs within one RB. An Enhanced-Physical Downlink Control CHannel (E-PDCCH) will be transmitted using at least one E-CCE or multiple E-CCEs. In another applicable transmission, the schemes in exemplary embodiments of the present invention can also be applied to other enhanced control channels, such as an Enhanced Physical HARQ Indication Channel (E-PHICH), or an Enhanced Physical Control Format Indication Channel (E-PCFICH).

Exemplary Embodiment 1: REG Based Precoding Cycling

A unified precoding definition can be defined similar to the large delay Cyclic Delay Diversity (CDD) in legacy systems:

$$\begin{bmatrix} y^{(7)}(i) \\ \vdots \\ y^{(6+v)}(i) \end{bmatrix} = W(i)D(i)U \begin{bmatrix} x^{(0)}(i) \\ \vdots \\ x^{(v-1)}(i) \end{bmatrix}.$$

For non-CDD transmission, one can define $D(i)=U=I_v$, where $I_v$ is the identity matrix, so that the precoding is simplified to:

$$\begin{bmatrix} y^{(7)}(i) \\ \vdots \\ y^{(6+v)}(i) \end{bmatrix} = W(i) \begin{bmatrix} x^{(0)}(i) \\ \vdots \\ x^{(v-1)}(i) \end{bmatrix}.$$

Note that exemplary embodiments of the present invention can be applied with both the CDD and non-CDD precoding as defined above. An exemplary embodiment of the present invention discloses methods of how W(i) is determined for each symbol.

In an exemplary embodiment of the present invention, the system assigns a set of REGs for control or data transmission for a particular UE. The resource allocation of the set of REGs can be previously indicated to the UE, or the UE may identify the allocation by blind decoding a limited number of possible resource combinations.

Assume N REGs are assigned to the UE, with respective size $I_{REG}^n$ for each REG n. Define i' as the REG index where the i-th symbol is located. Note that i' is deduced depending on the REG configurations. For example, in a frequency domain partitioning as illustrated in FIGS. 3D, 3E, and 3F, $$i' = \arg\max_{i''} \left( i > \sum_{n=0}^{i''} l_{REG}^n \right).$$

More particularly, the precoder is selected according to $W(i)=W'(i')=C_k$, where k is the precoder index given by $$k = \left( \left\lfloor \frac{i'}{v} \right\rfloor \bmod M \right) + 1 \in \{1, 2, \ldots, M\},$$

and $C_1, C_2, \ldots, C_M$ denote a subset of precoder matrices in the codebook corresponding to the number of transmit antennas. If the transmission rank is restricted to one, the precoding selection can be simplified to k=(i' mod M)+1∈{1, 2, . . . , M}, which is dependent on the REG index.

In an exemplary embodiment of the present invention, the UE will deduce the precoding information for each of its allocated REGs by the rules specified above regardless of whether the allocated REGs are localized or distributed.

FIGS. 5A through 5C are diagrams illustrating REG-based precoder cyclings according to exemplary embodiments of the present invention.

Referring to FIGS. 5A through 5C, multiple UEs are multiplexed within one Primary Resource Block (PRB) using the same antenna ports 7-10. The precoding matrix W(i) is applied to the DMRS port 7-10. W(i) is determined by the REG index within each UE's allocation.

Figure 6A:
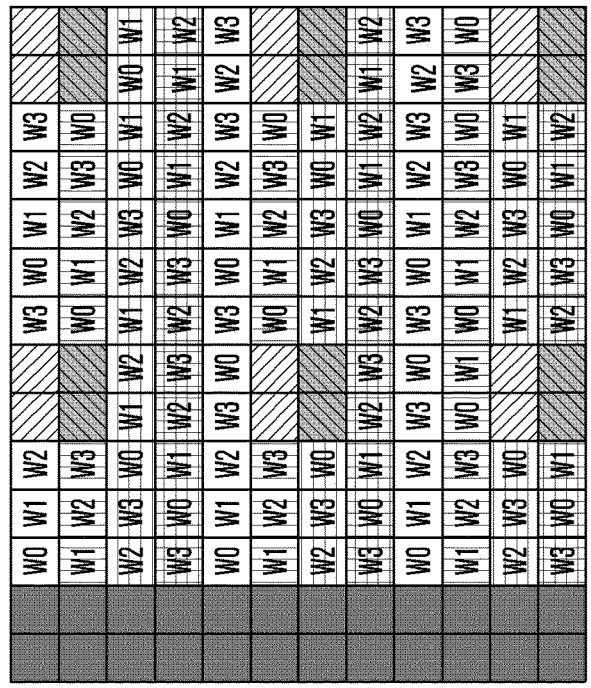
FIGS. 6A and 6B are diagrams illustrating REG-based precoder cyclings according to exemplary embodiments of the present invention.
Figure 6B:
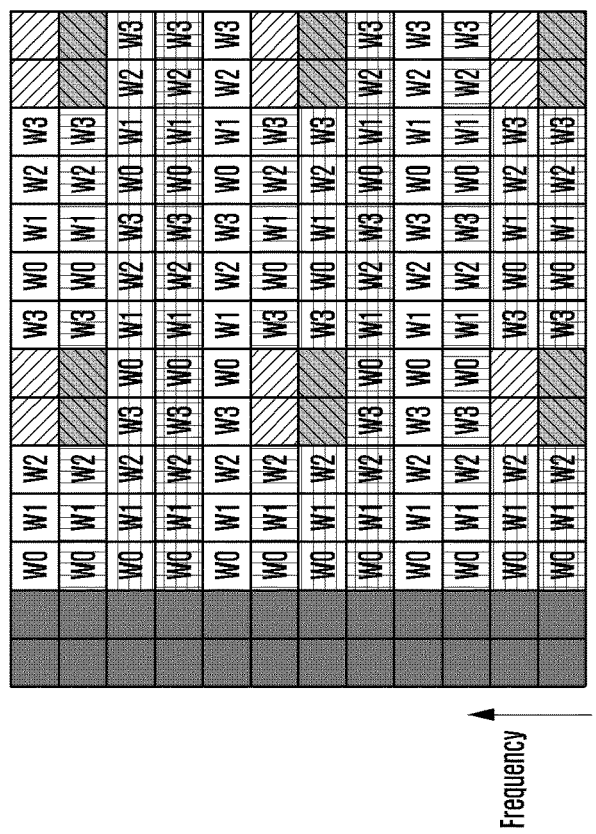

FIGS. 6A and 6B are diagrams illustrating REG-based precoder cyclings according to exemplary embodiments of the present invention.

Referring to FIGS. 6A and 6B, the precoding can be cycling inside an REG. FIGS. 6A and 6B illustrate an example of when an REG is a subcarrier within an RB. i' is defined as the RE index for symbol i which is located within REG i'. The precoder is selected according to $W(i)=W'(i')=C_k$, where k is the precoder index given by $$k = \left( \left\lfloor \frac{i''}{v} \right\rfloor \bmod M \right) + 1 \in \{1, 2, \ldots, M\},$$

and $C_1, C_2, \ldots, C_M$ denote a subset of precoder matrices in the codebook corresponding to the number of transmit antennas. If the transmission rank is restricted to one, the precoding selection can be simplified to k=(i" mod M)+1∈{1, 2, . . . , M}, which is dependent on the REG index.

It can be extended to other exemplary embodiments of the present invention that W(i) is dependent on the global REG index within the allocated Virtual Resource Block (VRB) for the special transmission, e.g., for an enhanced control channel transmission, or dependent on the relative REG index within an RB.

When a UE is allocated with multiple REGs which are distributed in multiple RBs, the same precoder definitions can be applied to each RB. Alternatively, the precoder can have a further cycling on an RB index or a subframe index. For example, the k=((i'+F)mod M)+1∈{1, 2, . . . , M}, where $F=F(n_{RB},n_{subframe})$ is a predefined function depending on the RB index $n_{RB}$ where the REG is located, and/or the subframe index $n_{subframe}$ where the REG is located. For example, $F=F(n_{RB},n_{subframe})=n_{RB} \cdot n_{subframe}$.

For intra-REG precoder cycling case, the precoder can have a further REG index, and/or cycling on an RB index, and/or a subframe index. For example, the k=((i"+F)mod+M)+1∈{1, 2, . . . , M}, where $F=F(i', n_{RB}, n_{subframe})$. FIG. 6B illustrates an example for the case where M=4 and F=i'.

In an exemplary embodiment of the present invention, the precoder set $C_1, C_2, \ldots, C_M$ can change from RB to RB. For example, assuming there are N VRBs allocated for E-PDCCH precoder cycling transmission, the symbols in the n-th VRB will use a precoder subset $C_1^{(n)}, C_2^{(n)}, \ldots, C_M^{(n)}$. For example, the REs in VRB 1 will cycle between $P_1, P_2$, the REs in VRB 2 will cycle between $P_3, P_4$, and so on. Here, $\{P_i\}$ is the full set or a subset of the precoders in the codebook.

In an exemplary embodiment of the present invention, for the n-th VRB, only one precoder $C_1^{(n)}$ is defined, and the precoder changes from one VRB to another. Inside the VRB, all UEs scheduled will use the same precoder for demodulation, as illustrated in FIG. 7.

Figure 7:
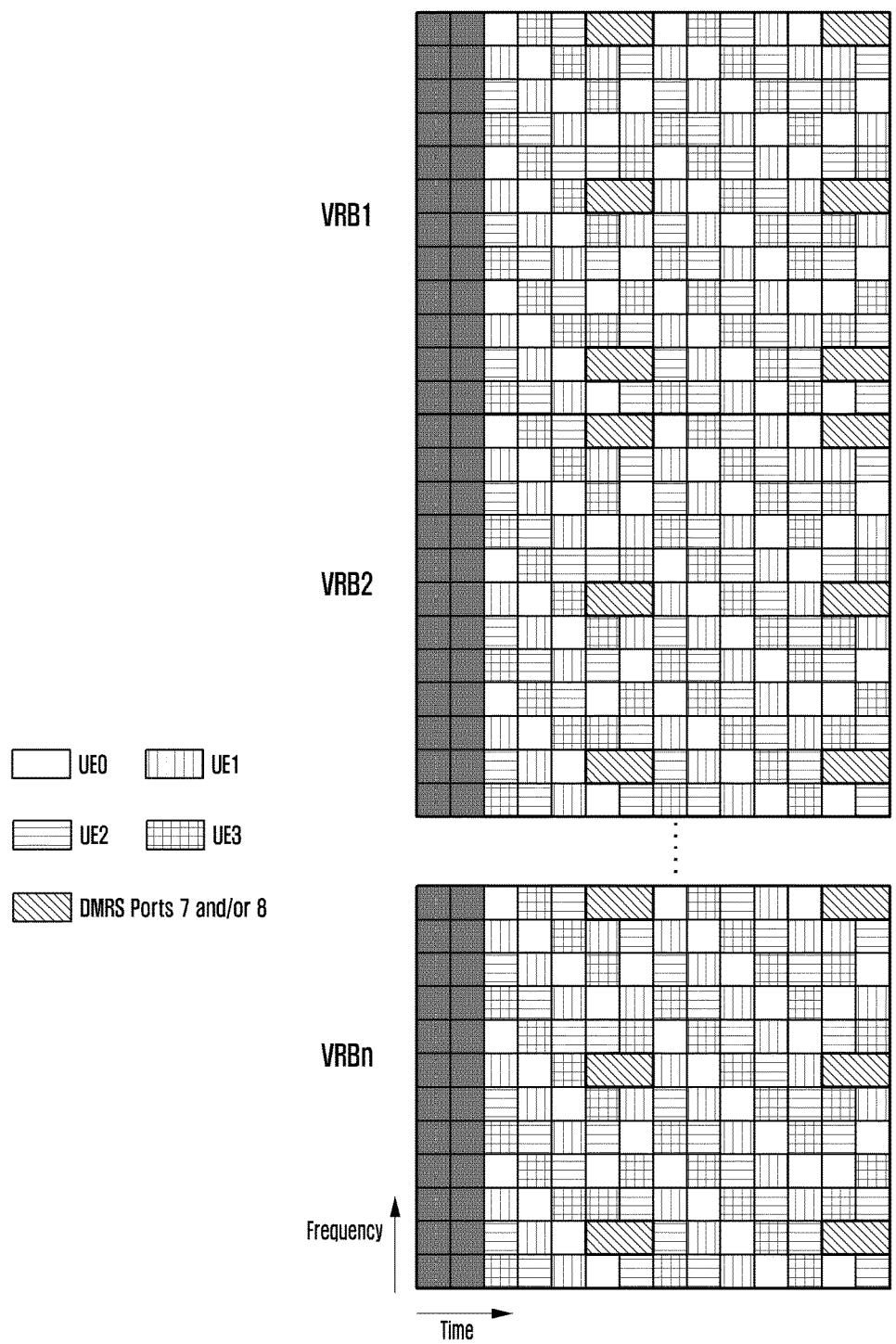
FIG. 7 is a diagram illustrating precoder cycling among multiple Virtual Resource Blocks (VRBs) according to an exemplary embodiment of the present invention.

FIG. 7 is a diagram illustrating precoder cycling among multiple VRBs according to an exemplary embodiment of the present invention.

Referring to FIG. 7, it is assumed that the control/data payload to resource mapping follows the same order of REG resource allocation, i.e., if the REG is allocated in time domain as in FIG. 3A, 3B, or 3C, the payload symbols will also be mapped to REs in the time domain first. In a 3GPP system, the legacy RE mapping follows the frequency first rule. When the frequency first rule is applied, the determination of i' and i" for payload symbol i will become more complex, but the same precoder mapping as described above will still apply. It should also be noted that REG interleaving is done before actual resource mapping of data symbols to physical REs, the REG interleaving may use the same interleaver used for legacy PDCCH REG interleaving as defined in 3GPP release 8~10.

Spreading or repetition can also be done across multiple REs in addition to the precoder cycling. For example, a control data symbol is transmitted on 4 neighboring REs with a spreading code of factor 4, and all those 4 REs use the same precoder. In a case of repetition, e.g., a control data symbol is repeatedly transmitted on 4 neighboring REs, each RE can use a different precoder. The neighboring REs can be a predefined REG. Such schemes of precoder cycling with spreading or repetition may be used for E-PHICH or E-PCFICH transmission in practice. E-PHICH is used for the indication of ACK or NACK by an eNB in response to the uplink transmissions made by a UE. E-PCFICH is used for the indication of the control region size that is used for the transmission of PDCCH or E-PDCCH. For PDCCH, E-PCFICH would indicate the number of OFDM symbols used for the transmission of PDCCH while for the E-PDCCH, E-PCFICH would indicate the number of RBs used for the transmission of E-PDCCH.

In summary, an exemplary method is disclosed so that:
  The REs in an RB are partitioned into one or several subsets,
  Each subset of REs in an RB is precoded using a predefined precoder,
  The precoder set applied for each RB may or may not change from RB to RB,
  The REs in one of the RE subset may be allocated for different UEs, and
  A UE utilizes the reference signal inside the RB for channel estimation, and demodulates data symbols together with the predefined precoder set information.

Exemplary Embodiment 2: REG and DMRS Port Cycling

In the previously described exemplary embodiment 1, W(i) is decided based on the REG location/index. It should be assumed that the UE knows the exact W(i) being applied for each REG.

In an exemplary embodiment of the present invention, the UE can decode the transmission by using precoded DMRS without knowledge of which W(i) is used for each REG. The UE should assume the precoding for spatial multiplexing using antenna ports with UE-specific reference signals in the legacy system, which is defined as:

$$\begin{bmatrix} y^{(7)}(i) \\ \vdots \\ y^{(6+v)}(i) \end{bmatrix} = \begin{bmatrix} x^{(0)}(i) \\ \vdots \\ x^{(v-1)}(i) \end{bmatrix}.$$

For each REG, the UE should assume it is transmitted using a specific DMRS. Rules should be designed so that the UE knows the DMRS port configuration for each REG.

Figure 8:
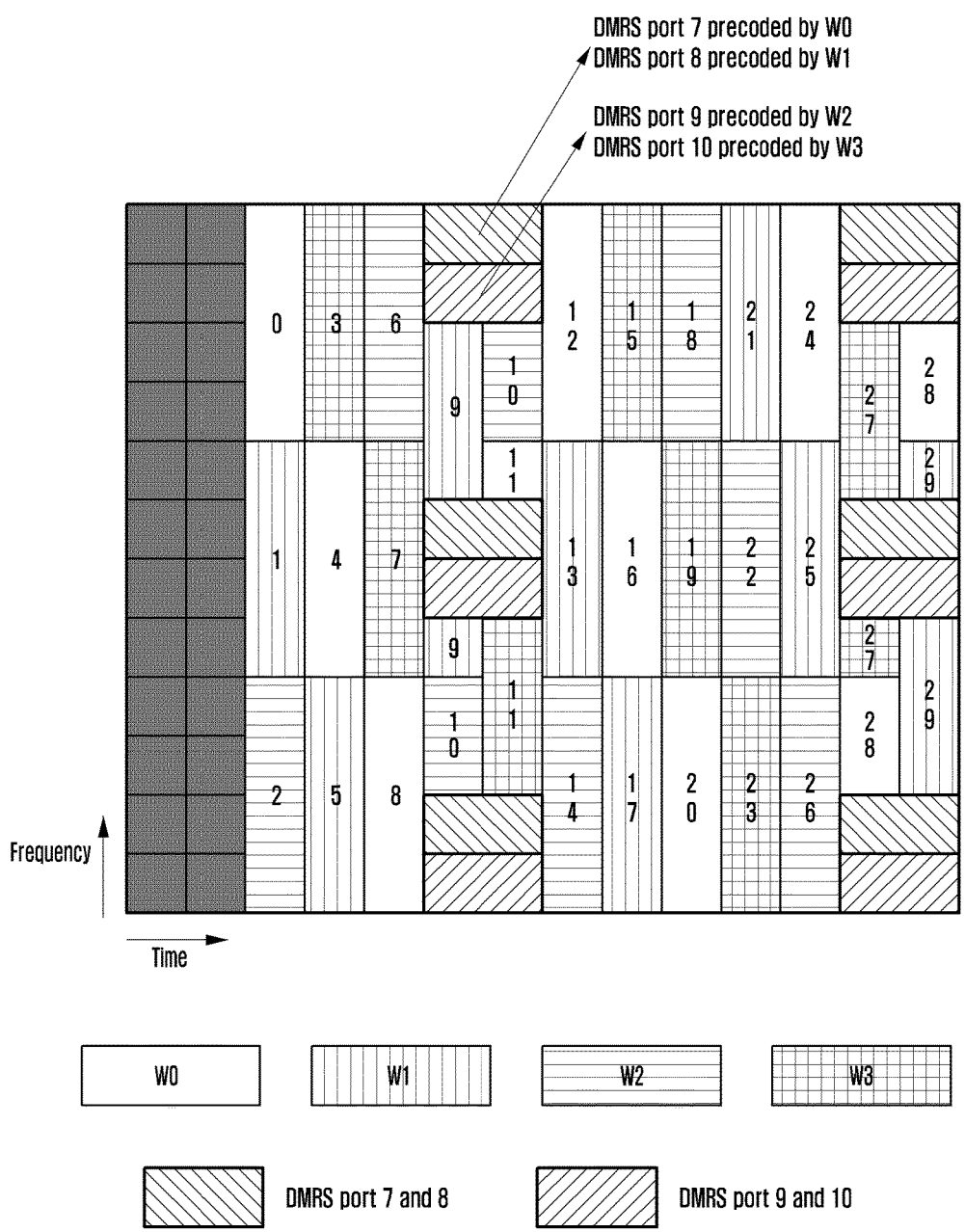
FIG. 8 is a diagram illustrating precoder cycling allocation with a predefined DMRS mapping according to an exemplary embodiment of the present invention.

FIG. 8 is a diagram illustrating precoder cycling allocation with a predefined DMRS mapping according to an exemplary embodiment of the present invention.

Referring to FIG. 8, precoding allocation with predefined DMRS mapping, where REG i' is transmitted using DMRS port 7+(i' mod M), where M=4 is illustrated. For each allocated REG, the UE will use corresponding DMRS ports for demodulation. Similar to the exemplary embodiment 1 of the present invention, the REG index here can be defined within an RB, or within a set of pre-allocated RBs.

The actual precoder applied to each REG in FIG. 8 is transparent to the UE. The eNB can choose to rotate using the entire codebook, a subset of the codebook, or any other precoder the eNB finds appropriate.

When a UE is allocated with multiple REGs which are distributed in multiple RBs, the same REG and DMRS port mapping can be applied to each RB. Alternatively, the precoder can have a further cycling on an RB index or a subframe index. For example, REG i is transmitted using DMRS port 7+[(i+F)mod M], where $F=F(n_{RB}, n_{subframe})$ is a predefined function depending on the RB index $n_{RB}$ where the REG is located, and/or the subframe index $n_{subframe}$ where the REG is located. For example, $F=F(n_{RB}, n_{subframe})= n_{RB} \cdot n_{subframe}$.

Figure 9:
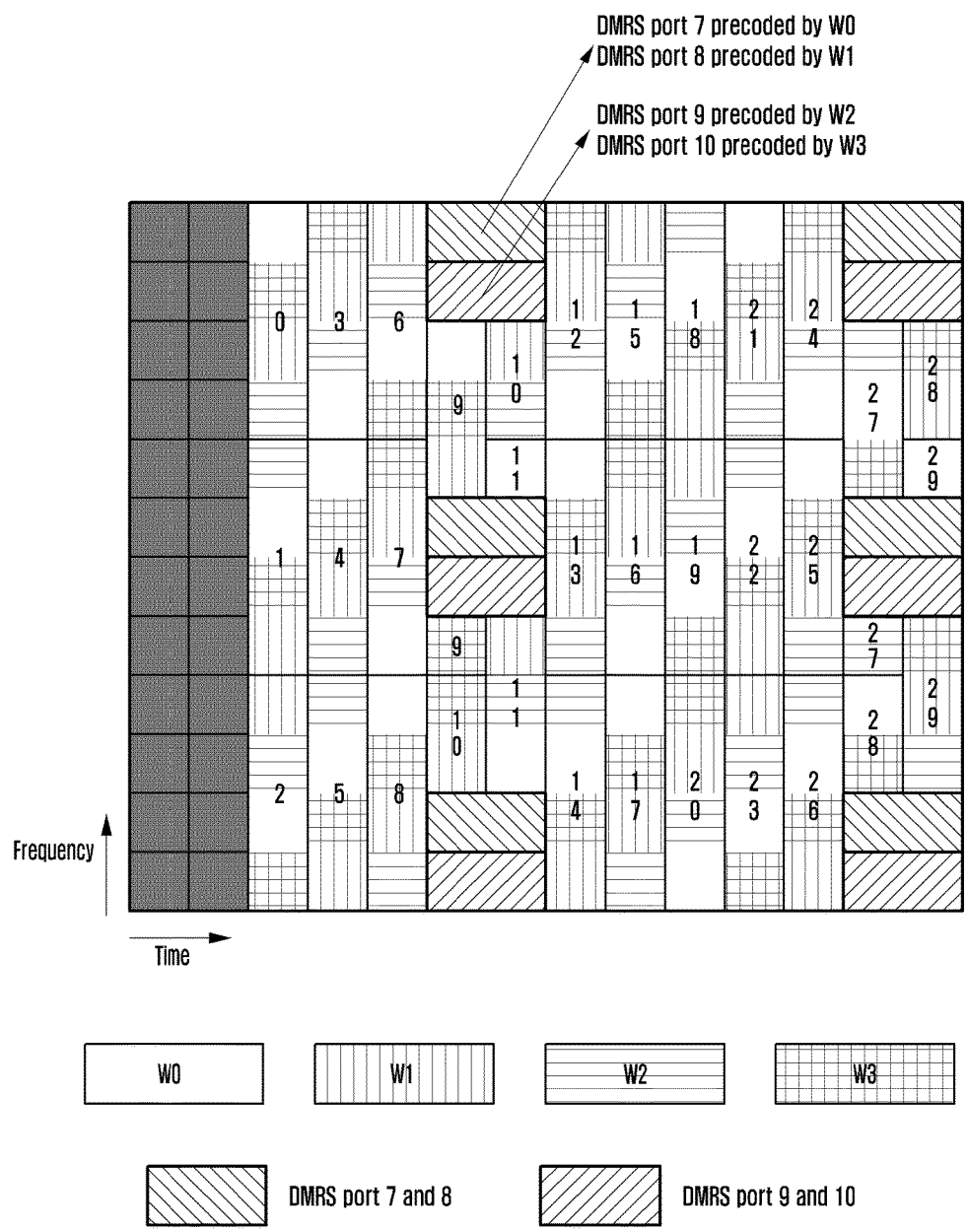
FIG. 9 is a diagram illustrating precoder cycling allocation with a predefined DMRS mapping according to an exemplary embodiment of the present invention where a precoding is changed within an REG.

Intra-REG cycling is also possible for this DMRS port based precoding cycling. An example is illustrated in FIG. 9, where the UE assumes DMRS ports 7-10 for decoding of one of the four REs in an REG. The intra mapping rule can be defined as the RE i" in REG i' is transmitted using DMRS port 7+[(i"+F)mod M], where $F=F(i', n_{RB}, n_{subframe})$. FIG. 9 illustrates an example for the case where M=4 and F=i'.

FIG. 9 is a diagram illustrating precoder cycling allocation with a predefined DMRS mapping according to an exemplary embodiment of the present invention where a precoding is changed within an REG.

Referring to FIG. 9, precoder cycling is done using four precoders W0, W1, W2, W3 with DMRS port 7, port 8, port 9, and port 10. The eNB may also change the precoder used for each DMRS port from RB to RB, e.g., port 7/8 uses W1/W2 in VRB 1, and uses W3/W4 in VRB 2, and so on. This operation is transparent to the UE, as the UE only utilizes the DMRS inside each RB for demodulation.

In an exemplary embodiment of the present invention, the system may only configure one DMRS port for an RB, e.g., all the REs use port 7 for demodulation assuming rank-1 transmission. The eNB may change precoder from VRB to VRB, which is transparent to the UE. In this case, as only one-port DMRS is transmitted, the DMRS power for port 7 can be boosted with 3 dB as no port-8 DMRS is transmitted. The configuration is similar to that in FIG. 6, except that only DMRS port 7 is configured/transmitted in the allocated REs.

Figure 10:
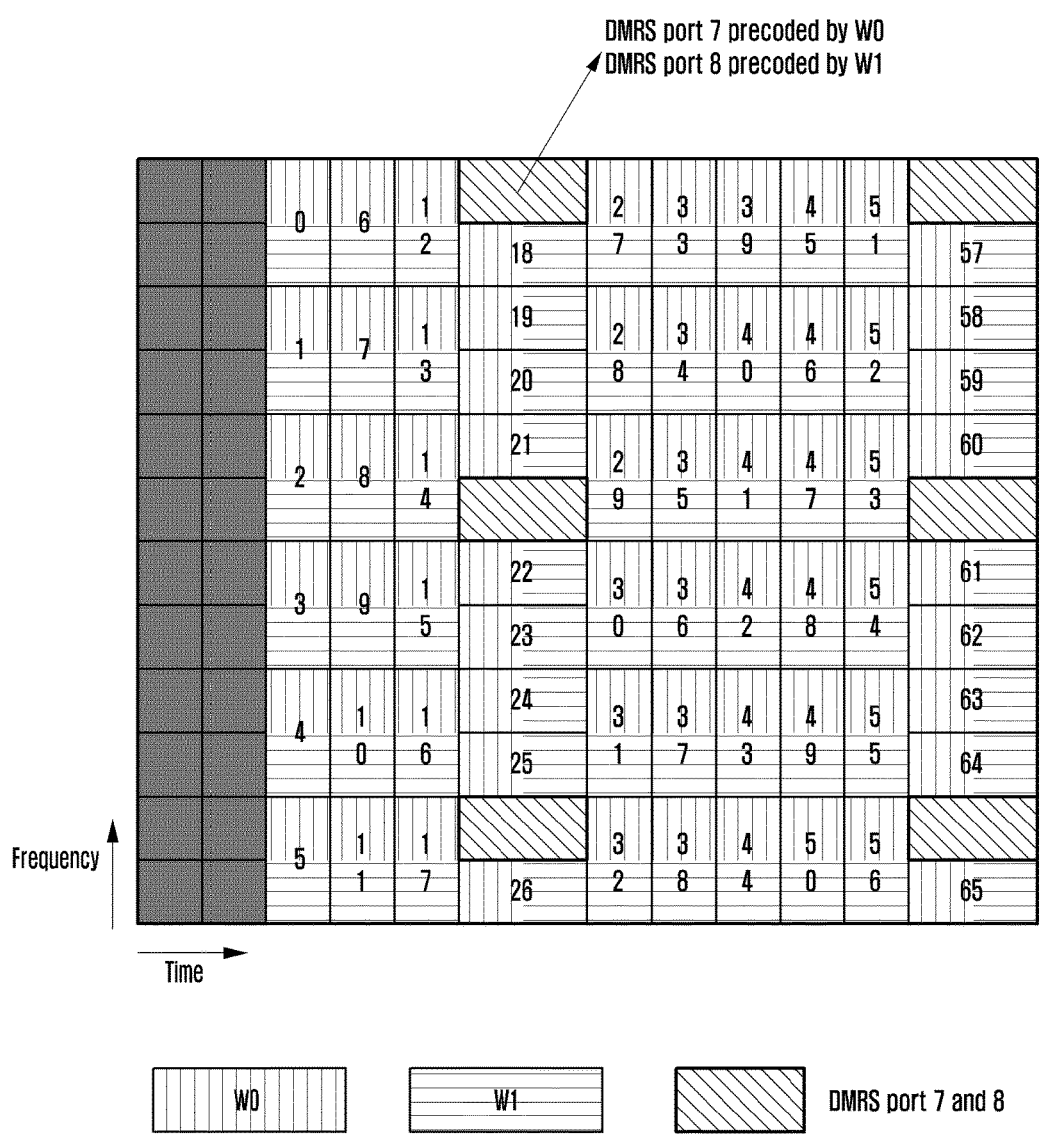
FIG. 10 is a diagram illustrating precoder cycling allocation with a predefined DMRS mapping according to an exemplary embodiment of the present invention where a precoding is changed within an REG.

FIG. 10 is a diagram illustrating precoder cycling allocation with a predefined DMRS mapping according to an exemplary embodiment of the present invention where a precoding is changed within an REG.

Referring to FIG. 10, REG allocation where the REs in an REG are grouped in a hybrid manner is illustrated. In FIG. 10, precoder cycling is done using two precoders W0 and W1 with DMRS port 7 and port 8. In a first group of OFDM symbols, e.g., 2 (if no PDCCH is configured), 3, 4, 7, 8, 11, an REG consists of two REs across the frequency domain, while in a second group of OFDM symbols, e.g., 5, 6, 9, 10, 12, 13, an REG consists of two REs across the time domain.

In the first group of OFDM symbols, there could be CRS, and/or an Enhanced Control CHannel (E-CCH), and/or PDSCH scheduled, in the second group of OFDM symbols, there could be DMRS, and/or CSI-RS, and/or E-CCH, and/or PDSCH scheduled. Note that such a grouping can be applied to both transmit diversity and precoder cycling modes. For transmit diversity, space-frequency block code is applied to the first group of OFDM symbols, whiles space-time block code is applied to the second group of OFDM symbols. For precoder cycling, two different precoders can be applied to the two REs in an REG, as illustrated in FIG. 9. In summary, the OFDM symbols inside an RB pair or a subframe are categorized into at least two types, for the first type of OFDM symbols, the REs are grouped along the frequency domain. For the second type of OFDM symbol, the REs are grouped along the time domain across two contiguous OFDM symbols of the second type. For example in a normal subframe of 3GPP system, the OFDM symbols of the first type include symbols #0, #1, #2, #3, #4, #7, #8, #11, the OFDM symbols of the second type include symbols #5, #6, #9, #10, #12, #13, assuming the 14 symbols inside one normal subframe are indexed from 0 to 13.

Note that in all the resource allocation as illustrated in FIGS. 4 through 10, the REG indexing is for illustration purpose and subjected to further interleaving before actual assignment to multiple UEs.

Spreading or repetition can also be done across multiple REs in addition to the port cycling. For example, a control data symbol is transmitted on 4 neighboring REs with spreading code of factor 4, and all 4 REs use the same port. In a case of repetition, e.g., a control data symbol is repeatedly transmitted on 4 neighboring REs, and each RE can use a different port. The neighboring REs can be a predefined REG. Such schemes of port cycling with spreading or repetition may be used for E-PHICH or E-PCFICH transmission in practice.

In summary, another exemplary method is disclosed so that:
  The REs in an RB are partitioned into one or several subsets,
  Each subset of REs in an RB is mapped to a predefined DMRS port,
  The precoder applied for each DMRS port may or may not change from RB to RB,
  The REs in one of the RE subset may be allocated for different UEs, and
  A UE utilizes the reference signal inside the RB for channel estimation of each DMRS port, and demodulates each data symbol with the predefined DMRS port channel.

Figure 11:
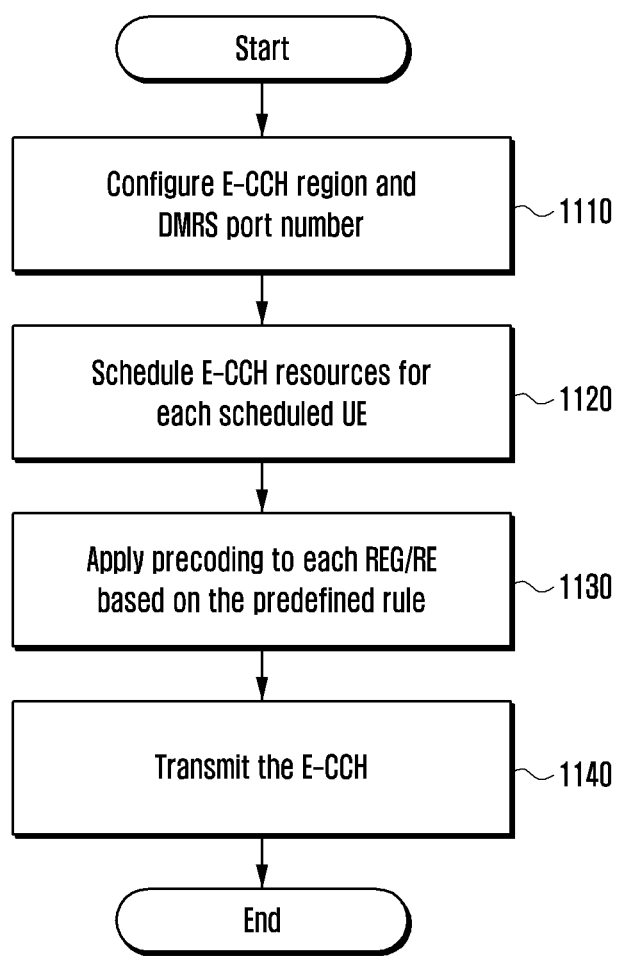
FIG. 11 is a flowchart illustrating a method for transmission of an Enhanced Control CHannel (E-CCH) of an evolved Node B (eNB) according to an exemplary embodiment of the present invention.

FIG. 11 is a flowchart illustrating a method for transmission of an E-CCH of an eNB according to an exemplary embodiment of the present invention.

Referring to FIG. 11, the eNB first configures the E-CCH region and corresponding DMRS information, such as the number of ports configured and a scrambling sequence used for those UEs that will receive the E-CCH at step 1110. Thereafter, the eNB schedules a number of UEs for each subframe at step 1120. If a UE is configured using E-CCH, the eNB will continue to schedule the E-CCH for the UE. Thereafter, the eNB decides on the precoding to be used for the scheduled UE according to the predefined rules at step 1130. The possible rules are described in the exemplary embodiments of the present invention. Thereafter, the eNB transmits the E-CCH to the UE at 1140.

Figure 12:
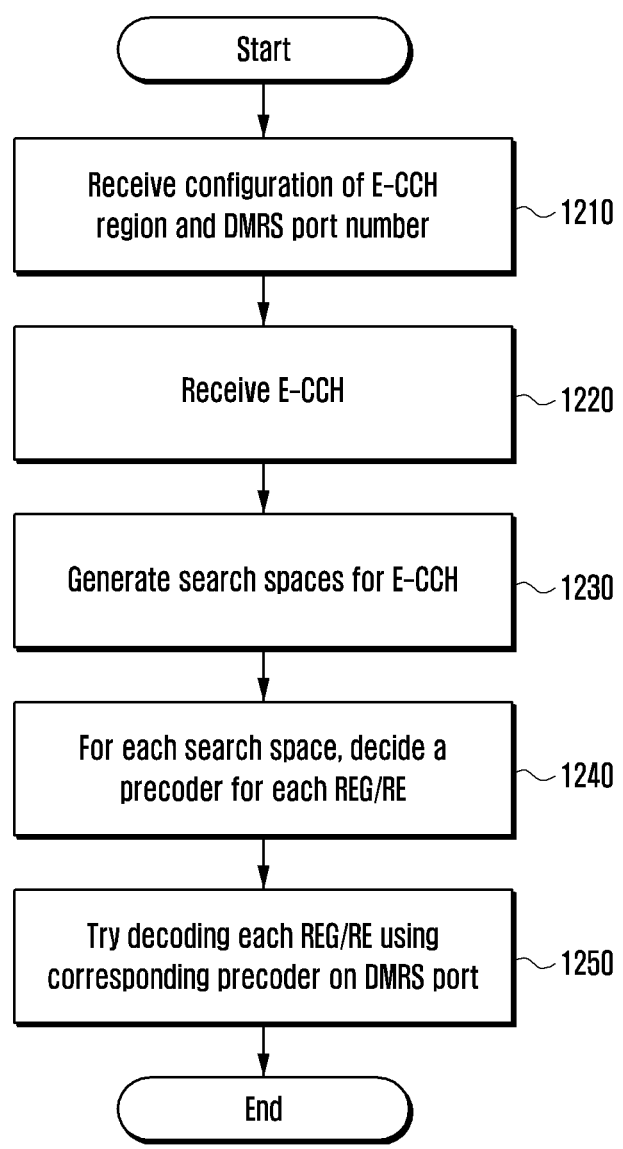
FIG. 12 is a flowchart illustrating a method for reception of an E-CCH of a User Equipment (UE) according to an exemplary embodiment of the present invention.

FIG. 12 is a flowchart illustrating a method for reception of an E-CCH of a UE according to an exemplary embodiment of the present invention.

Referring to FIG. 12, the UE first receives the configuration from the eNB on the E-CCH region and corresponding DMRS information, such as the number of ports configured and a scrambling sequence used at step 1210. Thereafter, the UE continues to receive the transmitted subframe from the eNB at step 1220. Thereafter, the UE generates search spaces for each possible E-CCH resource combination at step 1230. For each search space, the UE decides the corresponding number of DMRS ports for each REG/RE of the search space according to the rules described in the exemplary embodiment 2 at step 1240.

The UE performs channel estimation for each configured DMRS port, and uses the estimated DMRS channel for corresponding REG/RE demodulation at step 1250. Thereafter, the UE will go through the search space for E-CCH blind decoding.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for receiving control information by a user equipment (UE) in a wireless communication system, the method comprising:
  receiving, by the UE, information for configuring a control channel region for receiving the control information from a base station; and
  receiving, by the UE, the control information based on a resource element group (REG) and at least one demodulation reference signal (DMRS) from the base station,
  wherein the REG includes a plurality of resources elements (REs) used for the control information and the REG excludes REs used for the at least one DMRS,
  wherein the at least one DMRS is transmitted by using a first antenna port and a second antenna port of the base station, and
  wherein each RE in the REG is associated with one of the first antenna port or the second antenna port in an alternating manner.

2. The method of claim 1,
  wherein the information for configuring a control channel region indicates at least one of an RE, an REG, or a resource block (RB), and
  wherein a first precoder for the first antenna port and a second precoder of the second antenna port are mapped to REs included in the REG according to an order of the REs included in the REG and an order of the first antenna port and the second antenna port.

3. The method of claim 1, wherein the association between each RE in the REG and the first antenna port and the second antenna port for the at least one DMRS is predefined.

4. The method of claim 1,
  wherein the first antenna port is used to transmit a first reference signal of the at least one DMRS for the UE, and
  wherein the second antenna port is used to transmit a second reference signal of the at least one DMRS for the UE.

5. The method of claim 1, wherein each RE in the REG is located in a second slot of a subframe.

6. The method of claim 1, wherein the control information is received by using a distributed transmission in a frequency domain.

7. The method of claim 1,
wherein a first RE in the REG is associated with the first antenna port assigned to the UE, and
wherein a second RE in the REG is associated with the second antenna port assigned to the UE.

8. The method of claim 1, wherein the first antenna port and the second antenna port are used for transmission of the control information in case that multiple REGs which are distributed in multiple resource blocks (RBs) are allocated for a distributed transmission of an enhanced physical downlink control channel (EPDCCH).

9. The method of claim 1, wherein any of two consecutive REs included in the REG are associated with different antenna ports each other.

10. An apparatus for receiving control information in a wireless communication system, the apparatus comprising:
at least one processor configured to:
receive information for configuring a control channel region for receiving the control information from a base station, and
receive the control information based on a resource element group (REG) and at least one demodulation reference signal (DMRS),
wherein the REG includes a plurality of resource elements (REs) used for the control information and the REG excludes REs used for the at least one DMRS,
wherein the at least one DMRS is transmitted by using a first antenna port and a second antenna port of the base station, and
wherein each RE in the REG is associated with one of the first antenna port or the second antenna port in an alternating manner.

11. The apparatus of claim 10,
wherein the information for configuring a control channel region indicates at least one of an RE, an REG, or a resource block (RB), and
wherein a first precoder for the first antenna port and a second precoder of the second antenna port are mapped to REs included in the REG according to an order of the REs included in the REG and an order of the first antenna port and the second antenna port.

12. The apparatus of claim 10, wherein the association between each RE in the REG and the first antenna port and the second antenna port for the at least one DMRS is predefined.

13. The apparatus of claim 10,
wherein the first antenna port is used to transmit a first reference signal of the at least one DMRS for the UE, and
wherein the second antenna port is used to transmit a second reference signal of the at least one DMRS for the UE.

14. The apparatus of claim 10, wherein each RE in the REG is located in a second slot of a subframe.

15. The apparatus of claim 10, wherein the control information is received by using a distributed transmission in a frequency domain.

16. The apparatus of claim 10,
wherein a first RE in the REG is associated with the first antenna port assigned to the UE, and
wherein a second RE in the REG is associated with the second antenna port assigned to the UE.

17. The apparatus of claim 10, wherein the first antenna port and the second antenna port are used for transmission of the control information in case that multiple REGs which are distributed in multiple resource blocks (RBs) are allocated for a distributed transmission of an enhanced physical downlink control channel (EPDCCH).

18. The apparatus of claim 10, wherein any of two consecutive REs included in the REG are associated with different antenna ports each other.

* * * * *